June 15, 1965  S. BADERAK  3,188,901
VIOLIN TEACHING AID
Filed Dec. 30, 1963
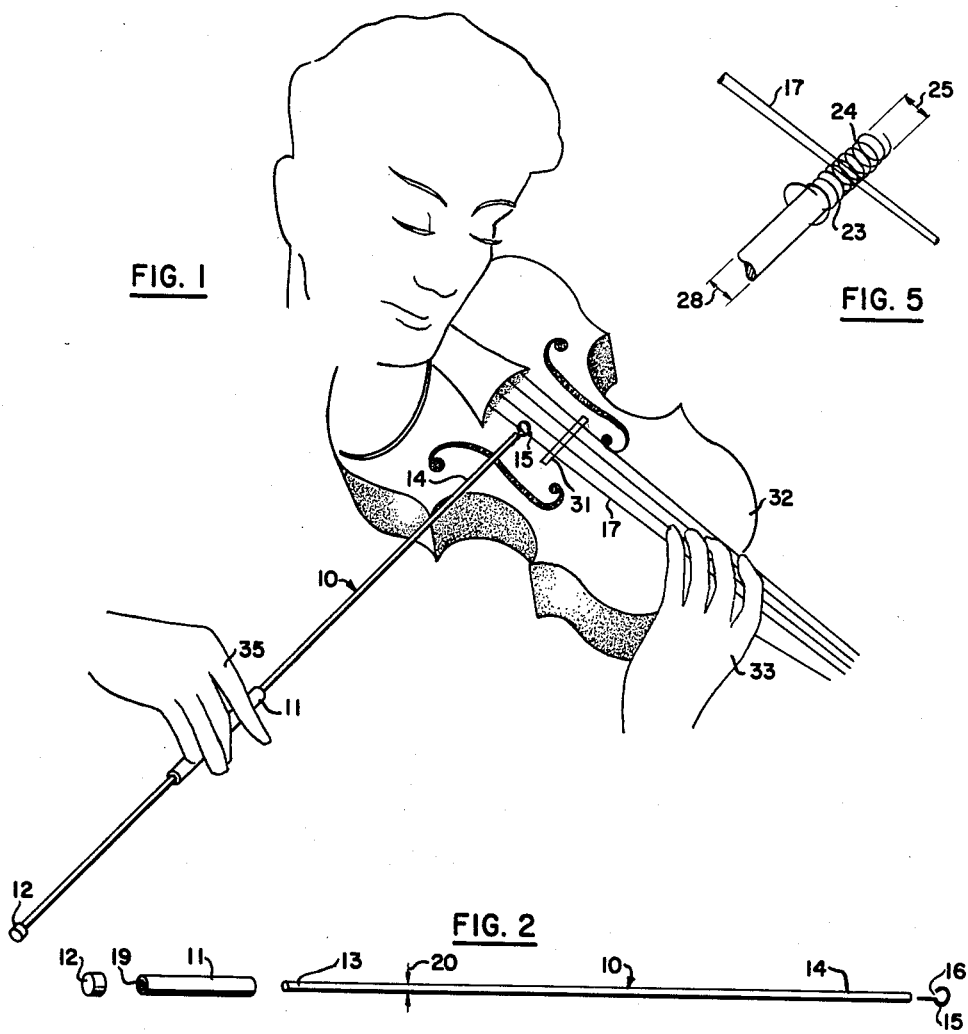
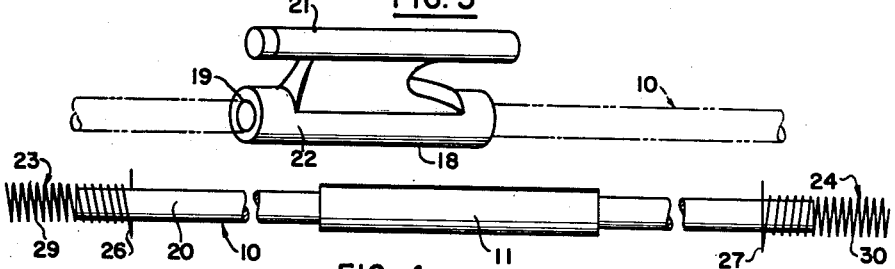
INVENTOR.
SEYMOUR BADERAK
BY Karl L. Spivak
ATTORNEY

United States Patent Office 3,188,901
Patented June 15, 1965

3,188,901
VIOLIN TEACHING AID
Seymour Baderak, 15 Belmont Lane, Levittown, N.J.
Filed Dec. 30, 1963, Ser. No. 334,539
8 Claims. (Cl. 84—283)

This invention relates to the field of musical instrument instruction and more particularly is directed to an external attachment for violins used as a bowing aid to beginning students.

Experience has shown that beginner violin students traditionally encounter difficulty in mastering the art of proper "bowing," that is, the ability to direct the bow squarely across the strings and at right angles thereto. Proper bowing is an absolute necessity in order to achieve the desired tone and effect from the violin. If the desired relation of the bow to the strings is not maintained together with the straight travel of the bow, it will be impossible to produce clear, steady tones. Until the student practices enough to master the art of bowing, it will be impossible for him to advance in his techniques and become a more accomplished performer. Beginners have a habit of sweeping the bow across the strings while curving the bow in a horizontal plane. Using presently known methods of instruction, instilling proper bowing motion in a beginner may take many months or even years of constant practice, all of which has to be carefully supervised to assure that the pupil does not unknowingly develop a faulty movement. The present invention permits the pupil to acquire the art of bowing with little or no supervision without effort and with no chance to develop faulty movements.

By utilizing my new invention, students can readily learn how to produce a good musical tone from the very beginning. The device enables a student to firmly establish correct bowing habits in the shortest possible time. While the instant invention presents a teaching aid of great simplicity, it insures proper arm movement and an instructor will not have to reteach the movement of the right arm when using an actual bow. The invention will insure relaxed and easy movement of the right arm which in turn will be reflected in the tone produced.

In addition to teaching beginners, I have found the teaching aid useful in correcting faulty bowing habits. Even students who have had some instruction can be aided through the use of this invention. The teaching aid is a boon to instructors as the proper movement may be taught in a simple and easy manner with a minimum of verbal explanation. It has been demonstrated that proper use of the invention can save hours of explanation and months of work. Students automatically will assume the correct flow and movement of the right hand.

The invention is extremely simple in construction and has a minimum number of working parts. It is equally adaptable to all size violins, violas, cellos and string bass. The teaching aid is inexpensive and may be used over and over for different students. Parents can be involved in the early lessons by assisting the child by holding the unattached end parallel to the bridge of the violin until the student becomes accustomed to its proper use.

Various rhythms may be readily taught using the instant invention and the student is assured that the bow arm is being used properly. Various advanced bowing such as spicatto and stacatto and especially the use of fingers and wrist can easily be taught. I have also found the teaching aid useful in teaching arpeggios going from one string to another to get a smooth movement from each string level. The device aids in teaching and developing the relaxed circular movement of the wrist and fingers, while the arm at the same time is moving up and down proceeding from string to string. In teaching beginners to place their fingers of the left hand firmly on the string, the natural tendency is to also tighten the muscles of the right hand. Using my invention, it is very easy to keep the muscles of the right hand relaxed while pressure is being applied with the fingers of the left hand. I have found the invention to greatly help in class instruction while working with an individual or a small group. While the instructor's attention is directed to the individual, the remainder of the class can be practicing silently being assured that the movements of the right hand are correct.

It is therefore an object of this invention to provide a violin teaching aid that will enable a beginner to acquire the proper bowing movement with little supervision.

It is another object of this invention to provide a violin teaching aid that will assure that the arm of a beginner violin student will automatically assume the correct sweeping motion to maintain the bow at right angles to the strings.

It is another object of this invention to provide a violin teaching aid fully adaptable and usable with violins of all known sizes and styles without alteration.

It is another object of this invention to provide a violin teaching aid utilizing a minimum of working parts that may be readily assembled, even by very young students.

It is another object of this invention to provide a violin teaching aid that is simple in construction, inexpensive in manufacture and troublefree in operation.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 1 is a perspective view showing my invention in use.

FIG. 2 is an exploded perspective view of my new invention.

FIG. 3 is a perspective detail showing a modification of my invention.

FIG. 4 is a perspective detail showing a modification of my invention.

FIG. 5 is a detail view showing the spring connection.

Although specific terms are used in the following description for the sake of clarity, these terms are intended to refer only to the particular structure of my invention selected for illustration in the drawings and are not intended to define or limit the scope of the invention.

The invention consists primarily of a relatively long, slender rod 10 and a hollow, cylindrical slide 11 slideably arranged thereon whereby the slide may be readily moved along the entire length of rod 10. If desired, end cap 12 may be fastened to outer extremity 13 as a keeper to prevent slide 11 from accidentally becoming disengaged from rod 10.

Violin end 14 of the rod provides point of attachment for small string engaging hook 15 which may be turned into or otherwise securely fastened to rod 10. Hook opening 16 permits rod to be readily attached to violin string 17 in easily removable engagement by lifting hook at right angles to the string and at the same time retains rod 10 in connection with string 17 during all normal back and forth movements of slide 11.

As shown in FIG. 3, I have provided an alternate method of slide construction to further help the student. The modified slide 18 is provided with internal longitudinal bore 19 of diameter equal to internal diameter of slide 11 and slightly larger than diameter 20 thus permitting complete freedom of relative movement between slide and rod. Handle portion 21 integrally connected with and extending from body portion 22 has been provided to simulate the appearance and feel of the frog of an actual bow. In this manner, the beginning student not only gains the feel of the proper movement, but at the same time becomes accustomed to the feel of holding an actual bow. By use of such a device, I have found that the transition from a practice instrument to the real instrument is readily and easily accomplished by the student.

Referring now to FIG. 4, I have shown a modified type of rod end device consisting of a pair of identical coil springs 23, 24 having effective diameter 25 slightly smaller than diameter 20 of rod 10 having a press fit upon approximately the outer one-half inch of each end 13, 14 leaving approximately one-half inch of free end 29, 30 extending in the clear beyond each end of rod 10. Innermost coils 26, 27 of respectivel springs 23, 24 are fabricated with diameter 28 of approximately twice the diameter 20 of rod 10, and larger than diameter of longitudinal hole 19 in slides 11, 19. In such a manner, I have provided a single spring serving the dual purpose of engaging violin string 17 upon free end 29, 30 and furnishing an effective slide stop through the employment of enlarged coils 26, 27.

In practice, the invention may be readily fabricated and used by first inserting rod 10 within longitudinal hole 19 of slide 11 and then attaching hook 15 to violin end 14 and cementing end cap 12 to outer end 13 of rod 10. Hook 15 may then be engaged about string 17 in the vicinity of bridge 31 of violin 32. The violin is grasped in the left hand of student 34 in the usual manner and slide 11 is held by the right hand 35 the same as holding the frog of a bow. It can then be seen that as slide 11 is moved back and forth along rod 10, hook 15 will pivot about string 17 automatically bringing rod and string into proper relative positions causing the arm of the user to unconsciously assume the correct bowing motion.

When using the modified arrangement shown in FIG. 4, the free end 30 of spring 24 is engaged upon string 17 and the device may be used in exactly the same manner as above set forth.

In order to use the invention, the student should hold the slide the same as a violin bow, keeping the thumb opposite the middle finger and slightly curved. The finger position should not be changed during use of the teaching aid. It is suggested that the spring be placed under the violin (D) string and over the (A) string. As habit is established, place spring or hook directly over any violin string, applying slight pressure to index finger in order to keep the teaching aid attached to the violin. While holding the slide correctly, bow the slide up and down along the rod with an easy and relaxed movement. It is recommended that the teacher initially hold the unattached end, keeping the device parallel to the bridge of the violin until the student becomes accustomed to proper use. Daily use of the invention before using the violin bow will establish correct movement of the right arm and eliminate usual preliminary bowing problems.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. A violin teaching aid comprising a long slender rod of relatively small diameter having violin engaging end and a free end, and violin string engaging means extending from said violin engaging end of said rod and finger grasping means slidably arranged on said rod intermediate the said ends.

2. The invention of claim 1 wherein said string engaging means comprise a hook securely connected to said end of rod.

3. The invention of claim 1 wherein said string engaging means comprise a hook securely connected to said end of rod, said hook providing an opening, said opening being slightly larger than width of said violin string.

4. The invention of claim 1 wherein said string engaging means include a coil spring having a plurality of coils, said coils spaced one from the other a distance slightly greater than width of said violin string.

5. The invention of claim 1 wherein said string engaging means include a coil spring having a press fit upon said violin engaging end of rod and wherein a portion of said spring extends beyond said end.

6. The invention of claim 1 wherein the travel of said finger grasping means is restricted between end stop means.

7. The invention of claim 1 wherein the travel of said finger grasping means is restricted between end stop means and said end stop means include a pair of spaced coil springs attached respectively to said ends of rod, said springs having at least one coil of enlarged diameter.

8. The invention of claim 1 wherein said finger grasping means includes a hollow cylindrical slide.

References Cited by the Examiner
UNITED STATES PATENTS

| | | | |
|---|---|---|---|
| 713,171 | 11/02 | Strauss et al. | 84—283 |
| 1,275,202 | 8/18 | Becker | 84—274 |
| 1,384,292 | 7/21 | Yates | 84—283 |
| 2,239,579 | 4/41 | Solodar | 84—283 |
| 3,107,568 | 10/63 | La Porte | 84—283 |

References Cited by the Applicant
UNITED STATES PATENTS

| | | |
|---|---|---|
| 556,216 | 3/96 | Schenk. |
| 2,041,146 | 5/36 | Portnoff. |

LEO SMILOW, *Primary Examiner.*